Jan. 6, 1970   H. G. QUICK, JR   3,488,698
DEVICE FOR BATTERY RETENTION
Filed Aug. 15, 1967
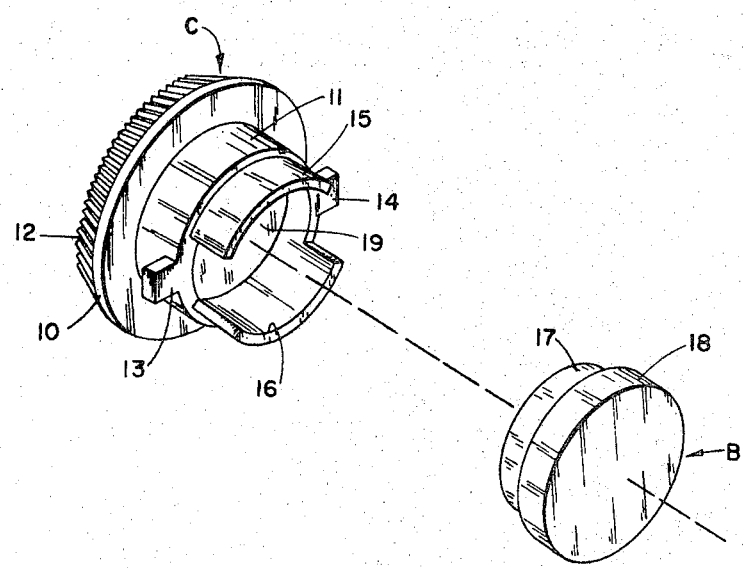
HOWARD G. QUICK, JR.
INVENTOR.
BY Gary D. Fields
Robert W Hampton
ATTORNEYS United States Patent Office 3,488,698
Patented Jan. 6, 1970

3,488,698
DEVICE FOR BATTERY RETENTION
Howard G. Quick, Jr., Rochester, N.Y., assignor to Eastman Kodak Company, Rochester, N.Y., a corporation of New Jersey
Filed Aug. 15, 1967, Ser. No. 660,701
Int. Cl. A47f 5/00
U.S. Cl. 248—309        3 Claims

ABSTRACT OF THE DISCLOSURE

A battery cover is provided which has interlocking lugs for reception in a housing for holding the cover in place and which is provided with a pair of arcuate resilient fingers adapted to grip the smaller end of a battery so that the battery may be inserted and removed from the housing when the cap is attached and removed.

BACKGROUND OF THE INVENTION

This invention relates to a battery cap or holder in which a battery is received for operating some electrically operated device, such as providing power for the exposure control of a camera. In the prior art, battery holders of many types and shapes are shown which are either hinged to the housing or are separately removable. Such battery caps or holders find utility in eyeglasses, which also contain hearing aids, portable radios and other devices of a similar nature. However, in some of these devices the battery is not removable with the cap or if it is removable with the cap, adequate means are not provided for assuring that the battery is properly mounted in the housing or in the cover, as the case may be.

SUMMARY OF THE INVENTION

In the present invention, a cap is provided which has arcuate shaped, spring fingers for receiving the smaller end of a battery, such as a mercury cell battery, but which are not sufficiently spaced apart to receive the larger end thereof, thereby assuring that the battery is always placed in a housing in proper position. In addition, the spring fingers grip the battery so that the cap or holder and battery can be inserted in the housing in a single operation and removed therefrom by a similar operation. In addition, the battery holder is provided with lugs which may interlock with appropriate means on the housing to hold it in place.

Additional features of this invention will become apparent from the description which follows, taken in conjunction with the accompanying drawing.

BRIEF DESCRIPTION OF THE DRAWING

The drawing is an exploded rear perspective view of the battery holder and mercury cell battery showing details of the battery gripping mechanism and the interlock means for holding the battery holder in place.

DESCRIPTION OF THE PREFERRED EMBODIMENT

In accordance with this invention, a battery cap or holder C, as shown in the drawing, has a cylindrical body 11 which is provided with a knurled knob portion 12 at one end which may be gripped by the fingers for inserting the cover into a housing, such as a camera housing. Cylindrical body 11 is provided adjacent its other end with a pair of diametrically opposed lugs 13 and 14, which are adapted to be received in complimentary notches in the housing so that the cap may be rotated and locked in place. A pair of arcuate lips or fingers 15 and 16 are formed integrally with body 11 and extend axially therefrom as shown and may be resiliently constructed so as to tightly grip the smaller or positive side 17 of battery B. Advantageously, lips 15 and 16 are so spaced so that they will receive the smaller side 17 but not the larger negative side 18. This prevents the battery from being inserted in the holder improperly. Body 11 may include a central depression or recess 19 to receive the end of side 17 of battery B. Since the fingers resiliently grip the battery, the battery and the housing may be handled as one unit after the battery is inserted, so that the battery may be placed in the housing merely by inserting the cover C into the housing and turning it to lock the lugs 13 and 14. When it is desired to change batteries, it is merely necessary to twist the cap so that the lugs 13 and 14 align with the complementary knotches in the housing and then withdraw the cap which carries the battery with it. The battery may then be pulled from between the resilient fingers 16 and a new battery placed between the fingers before reinserting the cap in the housing. Conveniently, the cap may be made of a unitary, molded construction, such as of plastic, to facilitate manufacture.

The invention has been described in detail with particular reference to a preferred embodiment thereof, but it will be understood that variations and modifications can be effected within the spirit and the scope of the invention.

I claim:
1. A battery holder for retaining a battery in a housing, the battery having a relatively small portion and a large circular portion, the diameter of said small portion being less than that of said large portion, said holder comprising:
    a cylindrical body having a longitudinal axis and two ends;
    a cap attached to one end of said body;
    at least a pair of spaced, arcuate, resilient fingers extending from the other end of said body for supporting said battery for insertion into the housing, said fingers extending generally parallel to said axis and being relatively spaced to receive said small portion of said battery between said fingers in gripping engagement, with the ends of said fingers in abutting engagement with said large portion of said battery; and
    means on said body for attaching said holder to said housing.
2. A battery holder, as set forth in claim 1, wherein:
    said attaching means includes at least a pair of diametrically opposed lugs extending generally perpendicularly from the axis of said body.
3. A battery holder, as set forth in claim 1, further including:
    a recess in said other end of said body for receiving a portion of said small portion of said battery.

References Cited

UNITED STATES PATENTS

| 2,910,580 | 10/1959 | McCleary | 136—173 X |
| 2,917,286 | 12/1959 | Deakin | 248—310 X |
| 3,070,748 | 12/1962 | Worobey et al. | 325—361 |
| 3,200,366 | 8/1965 | Stuart | 248—27 X |

FOREIGN PATENTS 429,845    6/1935    Great Britain.

ROY D. FRAZIER, Primary Examiner

J. F. FOSS, Assistant Examiner

U.S. Cl. X.R.

136—173; 325—361